United States Patent

[11] 3,585,489

| [72] | Inventors | Brian R. Pelly<br>Murrysville;<br>Laszlo Gyugyi, Pittsburgh, both of, Pa. |
|---|---|---|
| [21] | Appl. No. | 835,019 |
| [22] | Filed | June 20, 1969 |
| [45] | Patented | June 15, 1971 |
| [73] | Assignee | Westinghouse Electric Corporation<br>Pittsburgh, Pa. |

[54] A LOW-FREQUENCY AC REFERENCE GENERATOR WITH INHERENTLY BALANCED CONTROLLABLE OUTPUT VOLTAGE
11 Claims, 9 Drawing Figs.

[52] U.S. Cl. .................................................. 321/60,
321/65, 321/66, 321/69
[51] Int. Cl. ...................................................... H02m 5/22
[50] Field of Search ........................................... 321/7, 60,
61, 65, 66, 69; 318/277

[56] References Cited
UNITED STATES PATENTS
3,387,195 6/1968 Piccand et al. ................ 321/61 X 3,435,321 3/1969 Brandt ......................... 321/69 X
FOREIGN PATENTS
188,570 4/1967 U.S.S.R. ....................... 321/69

Primary Examiner—William H. Beha, Jr.
Attorneys—F. H. Henson, C. F. Renz and M. P. Lynch ABSTRACT: The invention comprises a low-power variable frequency AC generator with inherently controllable output voltage means and inherent phase reversal capabilities. The AC generator includes switching circuits which are controlled by the output pulses of an adjustable frequency pulse generator to establish the period within which each phase of a polyphase voltage source is in conduction. Additional control circuitry is provided to subdivide the period allotted for each phase conduction into a conduction and nonconduction subperiods to thereby control the amplitude of the output voltage waveform. The adjustable frequency pulse generator is controlled by a DC voltage and the frequency of the output pulses is proportional to this voltage.

INVENTORS
Brian R. Pelly and
Laszlo L. Gyugyi.
BY Michael P. Lynch
ATTORNEY

A LOW-FREQUENCY AC REFERENCE GENERATOR WITH INHERENTLY BALANCED CONTROLLABLE OUTPUT VOLTAGE

CROSS-REFERENCES TO RELATED APPLICATIONS

Related applications, Ser. Nos. 632,786 and 632,787, both entitled Static Frequency Converter With Novel Voltage Control, filed concurrently on Apr. 21, 1967 by the applicants of the present invention and assigned to the same assignee.

BACKGROUND OF THE INVENTION

In certain applications it is necessary to produce relatively low-power three-phase sinusoidal reference voltage waveform with controllable frequency and amplitude. One such application is the naturally commutated thyristor cycloconverter which provides a variable low frequency output from a fixed frequency input for the purpose of, for example, controlling the speed of an alternating current machine. Typically, the output frequency range of such a system would be 0—30 hertz/second. The thyristor cycloconverter can be regarded as being a power amplifier, the output of which tends to follow the amplitude and frequency of a sinusoidal reference input. In order to produce a substantially undistorted controllable three-phase output waveform with good balance between output phases, an essential requirement is an undistorted and well-balanced controllable three-phase sine wave reference waveform.

Hitherto, so far as is known, no satisfactory practical static method for generating the required low-power variable amplitude, variable frequency, balanced three-phase sinusoidal reference waveform has been devised. This has previously either been done by electromechanical methods or static means forming a quasi-sine wave consisting essentially of a "-stepped" square wave. This latter approach is complicated, uses many components, and is still not entirely satisfactory.

In addition to the complicated nature of the conventional reference waveform generators, the utilization of a power cycloconverter in controlling AC machinery necessitates the incorporation of a separate, sophisticated phase reversal control circuit to provide the capability of reversing the direction of rotation of the machinery.

SUMMARY OF THE INVENTION

The invention comprises a low-power reference waveform generator for developing a low-level AC reference signal for use as an input signal to a power converter system.

Due to the light current, low-power nature of the reference generator factors such as efficiency, power factor, etc., which are critical parameters in a power converter are of little or no concern in the operation of the reference generator. Therefore, it is possible to take advantage of the operational freedom afforded the reference generator in a manner which would not be economically feasible in a power generator.

In particular, it is possible to use the reversible output phase sequence characteristic of the reference generator circuit to provide an inherent method for reversing the phase sequence of the output voltage of the power converter and in turn the direction of rotation of the controlled AC machine. This reversible phase sequence characteristic cannot be realized directly in a power converter without substantial sacrifice in terms of system-operating parameters.

The novel AC reference voltage generator circuit includes sequentially operated switching circuits which establish the period within which each phase of a polyphase input voltage source conducts and thus effects the frequency of the output voltage waveform.

Additional control circuitry is provided to subdivide the period allotted for each phase conduction into a conduction and nonconduction subperiod to thereby control the amplitude of the output voltage waveform. This method of control of output voltage is clearly defined in the referenced related applications.

It is therefore the object of this invention to provide a reference generator circuit capable of:
 a. generating a variable frequency, balanced polyphase output voltage waveform;
 b. exhibiting inherent phase reversal characteristics; and
 c. controlling the amplitude of the output voltage waveform.

DESCRIPTION OF THE PREFERRED EMBODIMENT

Figure 1:
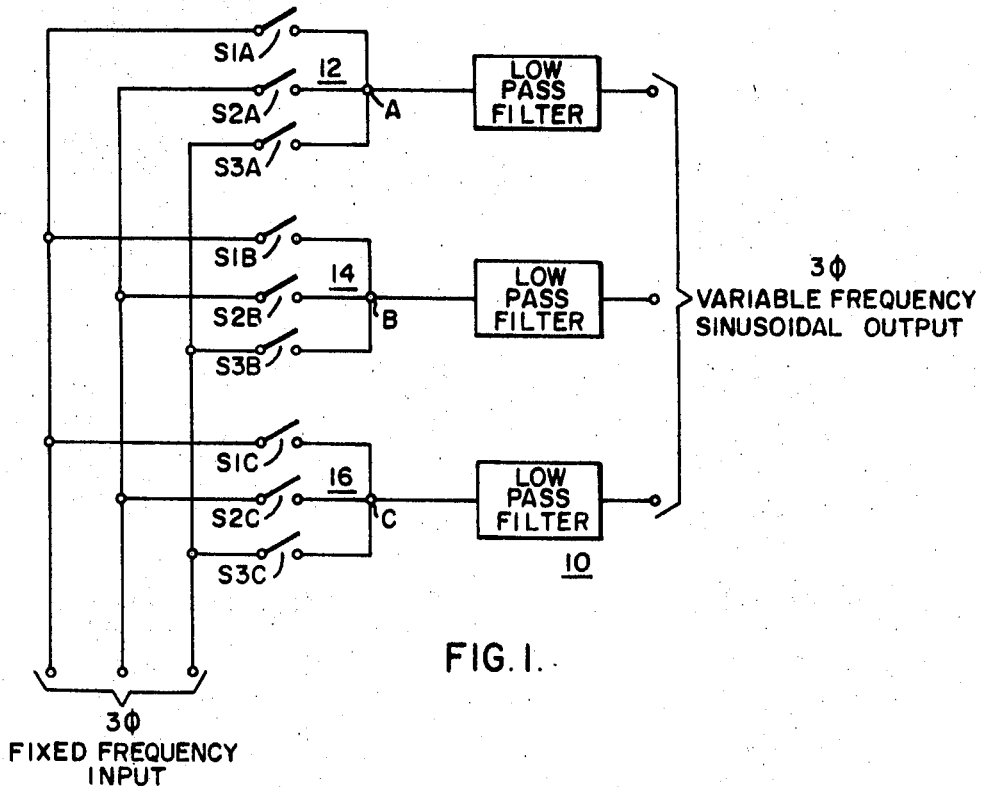
FIG. 1 is a basic schematic embodiment of the invention.

Referring to FIG. 1 there is illustrated schematically a basic generator system 10. The generator comprises switching devices S1A, etc., arranged in three-switch sets 12, 14, 16, each switch set terminating at a low-pass filter circuit. The switches S1A, etc. consist of static switching devices of types well known in the art. Each phase of a three-phase input voltage source is applied to one of the three switches in each of the switch sets 12, 14 and 16. It is apparent that the number of sets of switches and the number of switches within each set is dependent on the polyphase input voltage source utilized and the desired quality of the polyphase generator output waveform before filtering.

Furthermore, it is apparent that a bridge arrangement can be substituted to the illustrated switch arrangement.

Figure 2A:
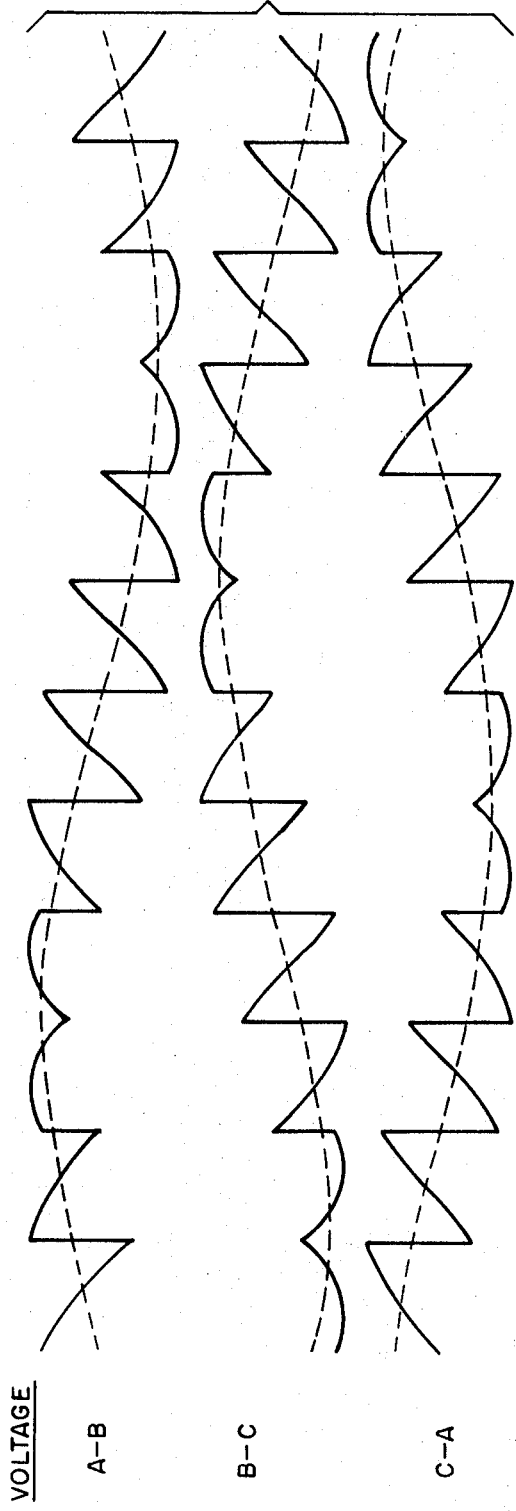
FIGS. 2a and 2b are typical voltage waveforms appearing between points A, B and C of FIG. 1.

The basic method of generating the three-phase output voltage is as follows: At a given point in time, switches S1A, s2B, s3C are simultaneously closed (all other switches being open). This state remains for a predetermined actuation period T at the end of which these switches are opened and switches S1B, s2c, s3A are simultaneously closed. This state again remains for a period T after which these switches are opened and switches S1C, S2A and S3B are simultaneously closed for a further actuation period T, the sequence of operations being repeated indefinitely. Typical voltage waveforms appearing between the points A, B and C of FIG. 1 are illustrated in FIG. 2a.

It can be shown that the "fundamental" components of these waveforms have a frequency of $$f_0 = \left| \frac{f_p}{n} - f_1 \right|$$

where $f_p = 1/T$, $f_1 =$ the input line frequency and $n =$ the number of input phases. These components are mutually displaced by 120°. Assuming a three-phase input supply the expression of the output frequency ($f_o$) indicates that there are two possible values of $f_p$, one greater, and the other less than $3f_1$, which would result in numerically the same output frequency. If $f_p/3$ is greater than $f_1$, then $$f_0 = \left( \frac{f_p}{3} - f_1 \right) \quad (1)$$

and if $\frac{f_p}{3}$ is less than $f_1$, then $$f_o = \left( f_1 - \frac{f_p}{3} \right) \quad (2)$$

Figure 3:
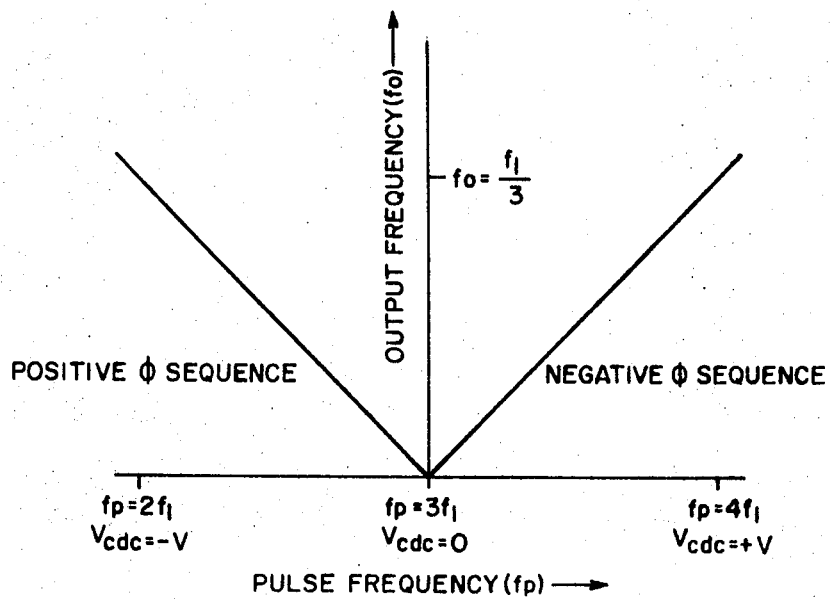
FIG. 3 is a graph illustrating the phase reversal characteristic of the invention.

The graph in FIG. 3 shows the relationship between the pulse frequency $f_p$ and the output frequency $f_o$. It can be seen that by controlling the pulse frequency from, for example $4f_1$ to $2f_1$, the output frequency is controlled from $f_1/3$ through zero and back to $f_1/3$.

Figure 4A:
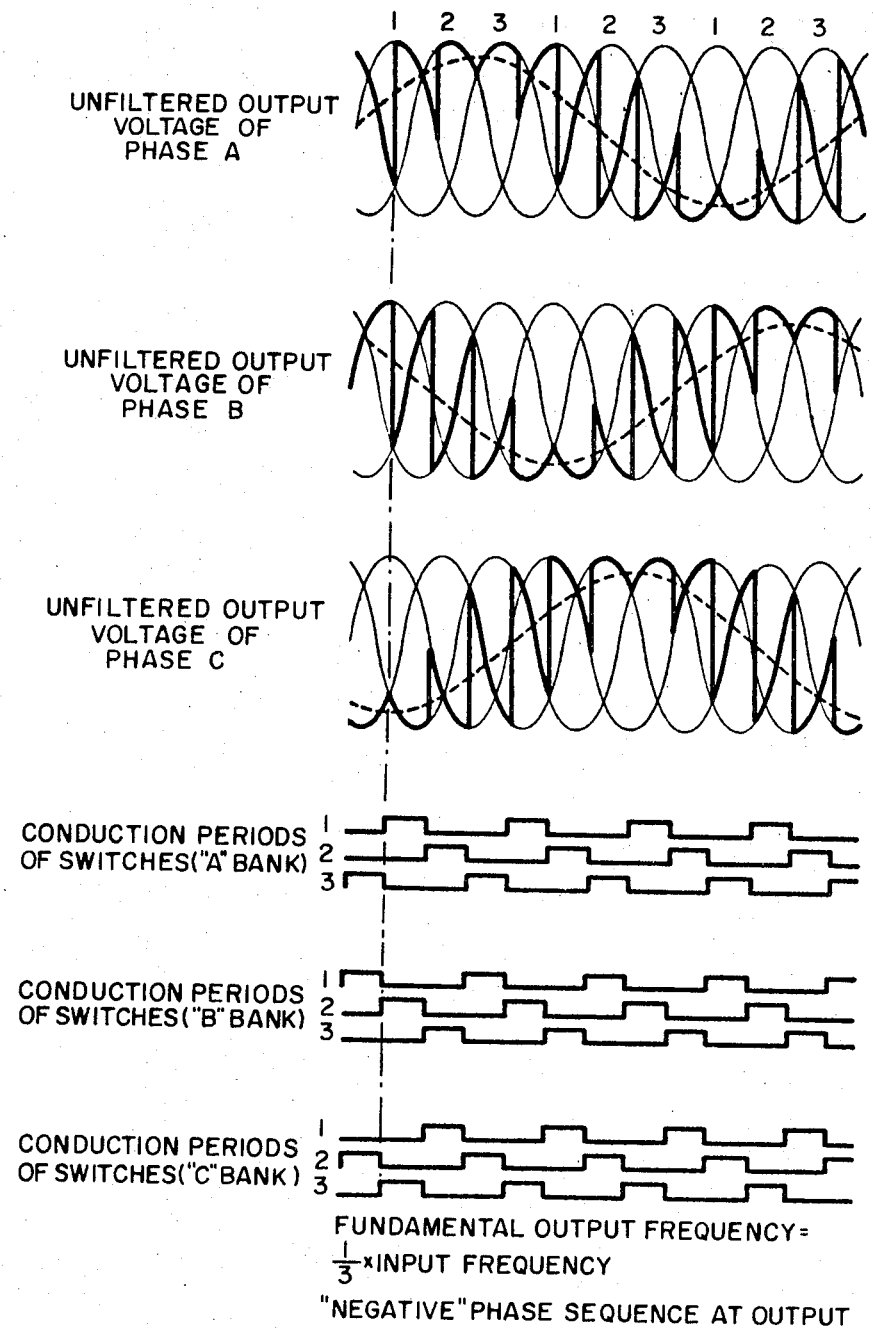
FIGS. 4a, 4b and 4c are illustrations of waveforms corresponding to the phase reversal characteristic of the invention.
Figure 4B:
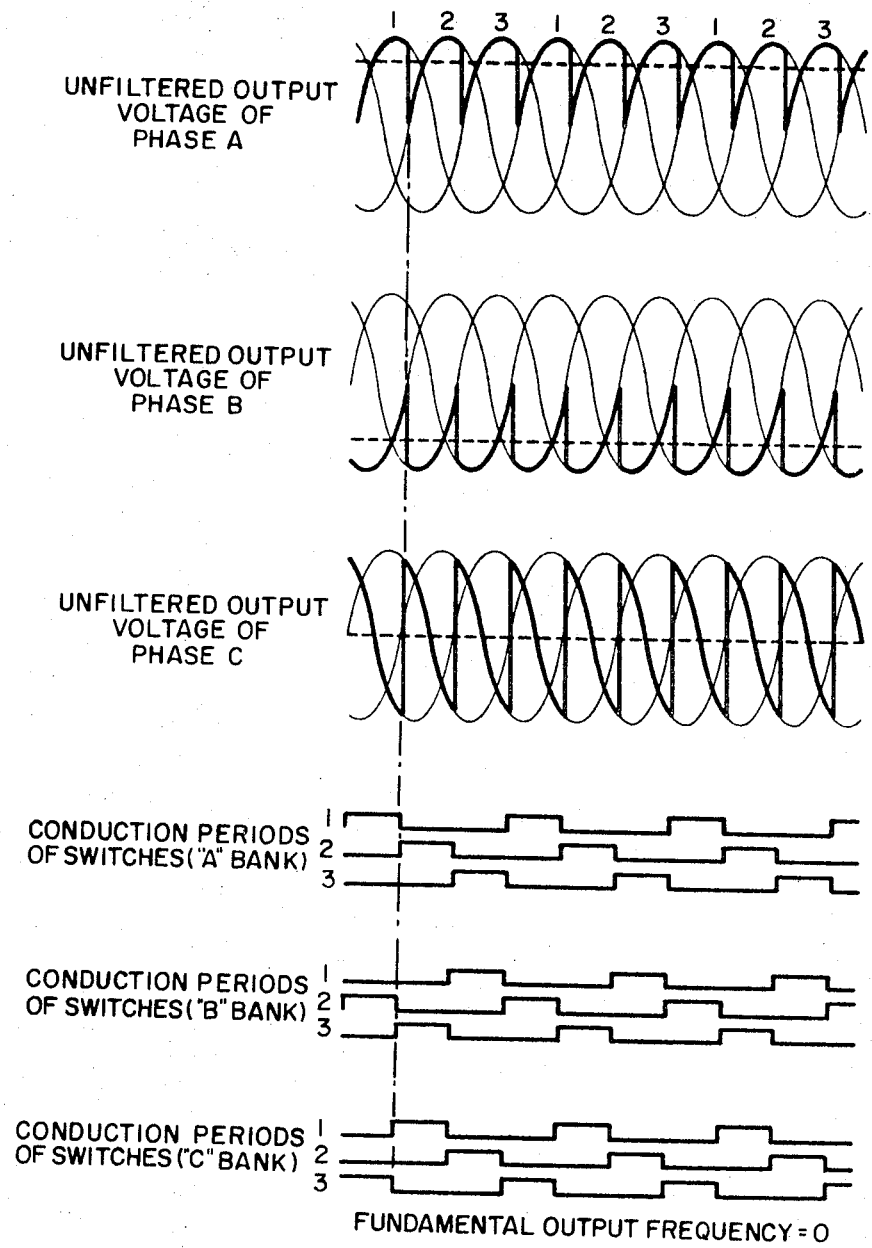
Figure 4C:
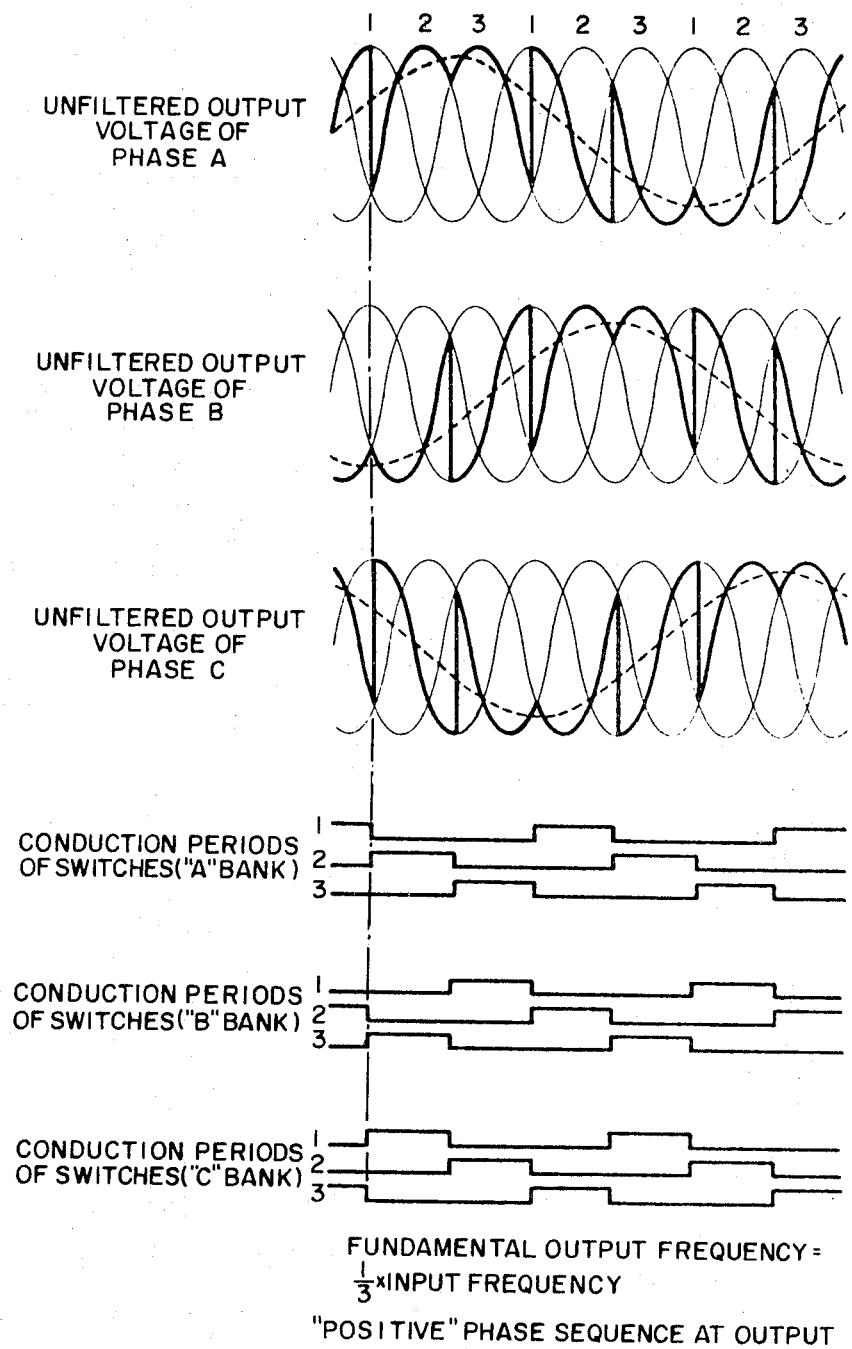

It can be shown mathematically that the phase sequence of the "fundamental" output voltages is negative for $f_p \geq 3f_1$, and for $f_p \leq 3f_1$, it is positive. Thus the phase sequence of the three-phase output voltages automatically reverses as the output frequency is controlled through the zero frequency condition. These theoretical mathematical results are confirmed by the waveforms shown in FIGS. 4a, 4b and 4c. At a, $f_p=4f_1$, the frequency of the fundamental component is $f_1/3$, and the phase sequence is negative. At b, $f_p=3f_1$, and the fundamental output frequency is zero. At c, $f_p=2f_1$, the frequency of the fundamental component is again $f_1/3$, but the phase sequence of the three-phase output voltages is now positive. This characteristic of the reference generator is, of course, exactly the required characteristic for a reversible AC motor drive.

It can also be shown mathematically that the distortion components in the output waveforms have frequencies of $(2/3 f_p+f)$, $(4/3 f_p-f_1)$, $(5/3 f_p+f_1)$, $(7/3 f_p-af_1)$, etc. A conventional low-pass filter circuit can be used to filter these harmonics in the output, and good sinusoidal output waveform can be obtained over the whole of the required frequency range.

Figure 2B:
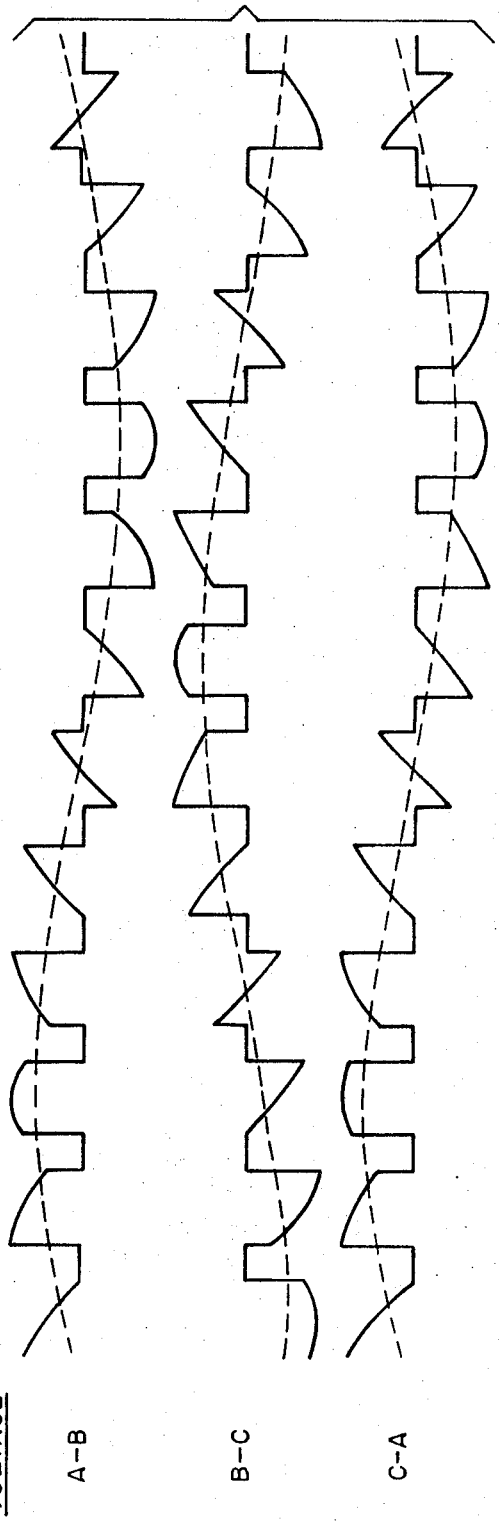

With the method of control described, the sinusoidal output voltage assumes a given maximum amplitude at all output frequencies. In order to control the voltage, the actuation period T is subdivided into subperiods (as defined in the above noted related applications), for example, $t_1$, designated the conductive period, and $t_2$, designated the nonconductive period. During the period $t_1$, the three appropriate switches (e.g., S1A, S2B and S3C) are closed. During the period $t_2$, the three switches connected to one or other of the input lines (e.g., S1A, S1B and S1C) are closed and all the other switches are opened. The net generator output voltage is zero with all switches of one input voltage phase closed because the potential difference between the output lines is zero. Typical voltage waveforms between the points A, B and C of FIG. 1 under these conditions are shown in FIG. 2b. With this method of voltage control, the spectrum of harmonic frequencies is the same as at full output voltage, so that filtering can still be easily achieved, and the output voltage can be continuously regulated from maximum to zero, inherent balance between output phases being maintained at all voltage levels.

During the period $t_2$, an alternate method of eliminating a reference output waveform would be to open all switches. This method may not always be practical however.

Figure 5:
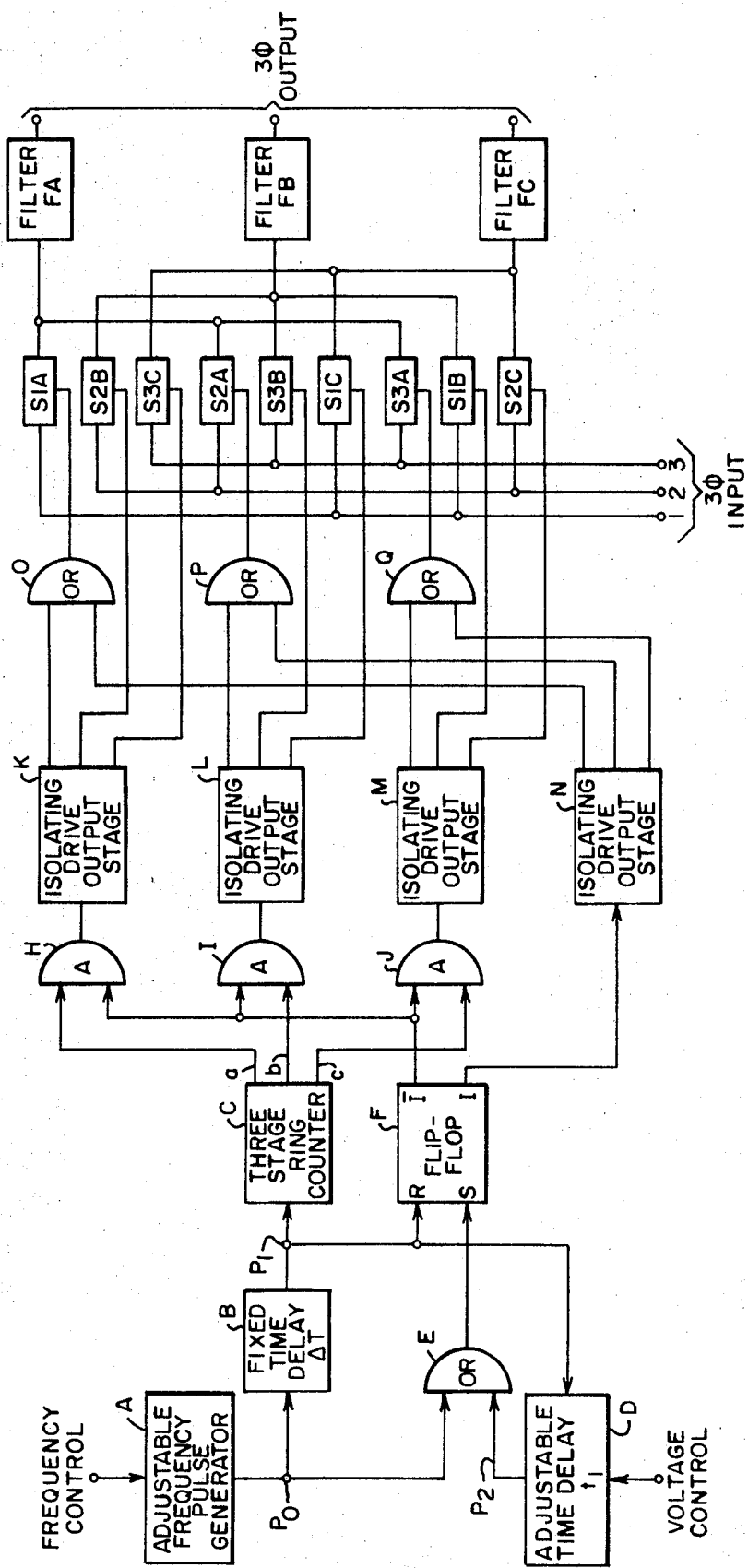
FIG. 5 is a schematic block diagram of a circuit in accordance with the preferred embodiment of the invention.

As an example of how the foregoing principle may be implemented in practice, FIG. 5 shows a schematic block diagram of a complete practical system.

Three terminals are provided for receiving a fixed frequency, three-phase input which terminals 1, 2 and 3 are connected to nine switches. The switches are divided into three sets of switches, one switch in each set having connected thereto one of the input terminals, the first input terminal 1 being connected to S1A, S1C and S1B. The outputs from the switches are organized so that the switches are again in sets of three but not in the same groupings as the relationship of the switches to the three-phase input terminals, thus, S1A, S2A and S3A are connected together to form a common output which output is passed through a filter FA to an output terminal for the system. For easier understanding, it will be noted that the first switch has been titled S1A. The S stands for switch, the 1 means that that switch is connected to the first input terminal and the A means that it is connected at its output to the filter FA.

The frequency reference is obtained from an adjustable frequency pulse generator A the input of which is connected to a DC voltage excitation source (not shown). The output of the pulse generator A is connected to the input of a fixed time delay circuit B, and also to an OR gate E. The output from the fixed time delay B is connected to a three stage ring counter C, to a bistable flip-flop circuit F, and to an adjustable time delay D. The output from the adjustable time delay is connected to the OR gate E which in turn is connected to the input of the flip-flop circuit F. The output from the three stage ring counter C is supplied to three AND gates, H, I and J. The output from the flip-flop circuit F is connected to the three AND gates H, I and J. The output from the flip-flop circuit is also connected to an isolating drive output stage N.

The outputs from the three AND gates, H, I and J, are connected respectively to three isolating drive output stages K, L, M associated one with each AND gate. The isolating stages can be represented by transformers having three isolated secondary windings. Each of three OR gates 0, P and Q is connected to receive the output from one of the isolating drive output stages K, L and M and to also receive the output from the isolating drive output stage N. Each of the isolating drive output stages K, L and M also has a second output and a third output connected directly to two of the nine switches. The outputs of the three OR gates 0, P and Q are connected respectively to switches S1A, S1C and S1B. Thus, it will be noted that each of the isolating drive output stages K, L and M is connected either directly, or indirectly through an OR gate, to three switches, these three switches being chosen so that each one is connected to a different phase of the three phase input and is connected to a different one of the output filters FA, FB and FC. Thus, each one of the switches is in three different groupings. Each switch is grouped with a first pair of switches to be subject to control from the same isolating drive output stage. Each switch is grouped with a second pair of switches and connected therewith to one of the three phase inputs. Each switch is grouped with a third pair of switches and connected therewith to a common output filter.

Figure 6:
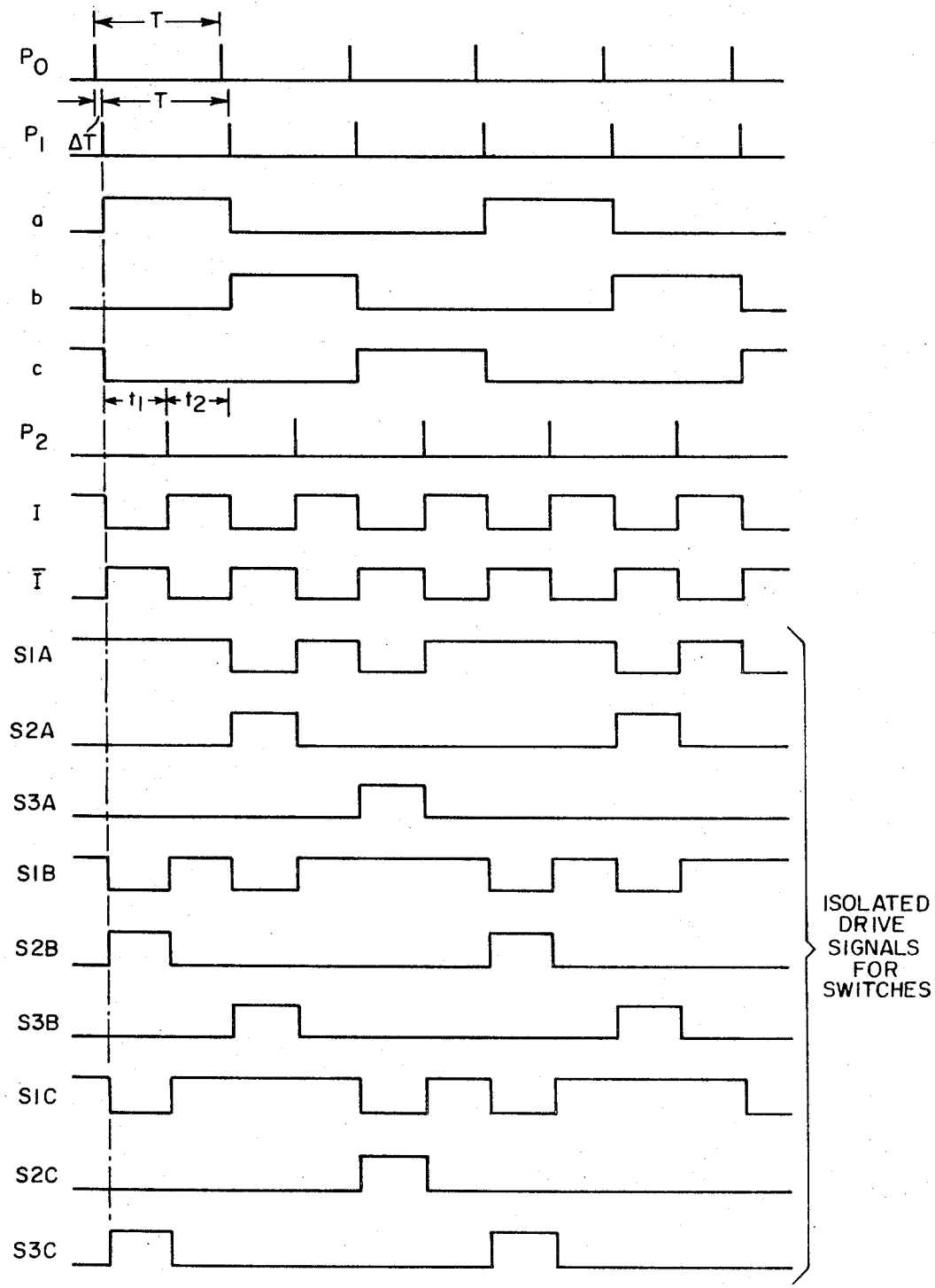
FIG. 6 is a pulse graph illustration of the operation of the system illustrated in FIG. 5.

The output of the adjustable frequency pulse generator A consists of a train of short duration pulses, $P_0$, illustrated in the pulse graph of FIG. 6, occurring at regular actuation time intervals, T defined by the pulse frequency, $f_2$. These pulses are fed to the fixed delay circuit B, the output pulses $P_1$, of which are delayed by a time $\Delta T$ with respect to the pulses $P_0$. The pulses P are fed to the input of the three stage ring counter circuit C. The pulses $P_1$ are also fed to the adjustable delay circuit D, the output pulses $P_2$ of which are delayed by a time $t_1$ with respect to the pulses $P_1$. The pulses $P_2$ are fed to one input of the OR gate E. The pulses $P_0$ are fed to one input terminal of a bistable flip-flop circuit F. Thus, F is switched into the set position either by the delayed pulse $P_2$, or in the event of the time delay setting of the circuit D being greater than the interval between $P_1$ and the reset pulse $P_0$, then this latter pulse sets the flip-flop circuit F. Thus $P_0$ serves as an end stop pulse and marks the limit the time $t_1$ which represents a conduction period. As illustrated in FIG. 6, the $\Delta t$ delay of delay circuit B provides for stable operation by maintaining the limits of the conduction period $t_1$ within the limits of the actuation period T. Since the period between $P_0$ and the reset pulse $P_1$ is relatively short, the maximum possible time, $t_1$ is very nearly equal to T. Under this condition, the maximum possible practical output voltage is obtained (but this is not quite the theoretical maximum because $\Delta T$ is finite). The flip-flop circuit F is reset by $P_1$, and its output waveforms are I and $\bar{I}$. The outputs a, b and c of the three-stage ring counter C are respectively fed to one input of the two-input AND gates, H, I and J. The output $\bar{I}$ of the flip-flop F is fed to each of the other input terminals of these AND gates. The outputs of these AND gates are fed to the isolating drive output stages K, L and M. Thus, each of these output stages delivers an output drive signal during the conduction period $t_1$ so long as it also receives an input signal from the appropriate output channel of the ring counter C. The output I of the flip-flop circuit F is fed to the input of the isolating drive output stage N. The three isolated output channels of this circuit are connected through the OR gates 0, P and Q to the control terminals of the switches S1A, S1B, S1C. Thus, these switches always receive a drive signal during each period $t_2$ and are responsible for the flat portions of the waveform shown in FIG. 2b. The output filters FA, FB and FC comprise conventional low-pass filter circuits and provide for an undistorted final three-phase output.

The foregoing system fulfills all the necessary functions: isolated drive signals are distributed to the switches in the appropriate sequence; control of the output frequency is achieved by controlling the frequency of the pulse generator A, and control of the output voltage is achieved by controlling the time delay $t_1$ of the adjustable time delay circuit D.

Furthermore, since the adjustable frequency pulse generator is controlled by a DC voltage, $V_{cdc}$, and the pulse frequency $f_p$ is proportional to this voltage as indicated in the chart of FIG. 3, then the reference generator will display the inherent characteristic of phase reversal required for reversible AC motor drives.

It is pointed out that the circuits described comprise only one particular embodiment of the basic ideas, and there are many variants thereof. For example, the bidirectional switches in the basic arrangement of FIG. 1 could be replaced by unidirectional switches (gate controlled switches, for example) if a separate direct current biasing supply is added for the purposes of maintaining a net current flow in the switches. Furthermore, it is not necessary to use the three-phase half-wave type of circuit configuration shown in FIG. 1. In some cases, it might be more convenient, for example, to use three six-phase-type switching circuits, each of which could take the form of a three-phase bridge configuration, one for each output phase.

While the discussion has been directed to a three phase system, the principles disclosed render the circuit equally applicable to other multiphase configurations.

What we claim is:

1. A polyphase, variable frequency, sinusoidal waveform generator for producing low-power, balanced, reference waveforms comprising, a plurality of switching element sets, each set including multiple switching elements, an alternating-current input voltage source of at least one phase, each phase of said input voltage operatively connected to at least one of the switching elements in each of said switching element sets, an adjustable frequency pulse generator means having an input and an output terminal, said input terminal connected to a voltage excitation source, first circuit means responsive to the output of said adjustable frequency pulse generator and connected to said switching element sets for actuating combinations of said switching elements, the period of actuation of said switching element combinations determined by the output pulses of said pulse generator, the actuation of said switches generating a sinusoidal reference waveform, second circuit means associated with said first circuit means to determine periods of conduction of said actuated switches within said actuation period, the amplitude of the reference waveform being a function of the duration of the conduction periods of said switching elements, said adjustable frequency pulse generator providing for selective phase sequence reversal of the reference waveform.

2. A combination of claim 1 including filter means associated with said switching element sets to filter the harmonic content of the reference waveform generated during the conduction periods to provide for an undistorted sinusoidal reference waveform, said harmonic content being a function of the frequency of the input voltage waveform and the frequency of the generated reference voltage waveform.

3. The combination as claimed in claim 1 wherein the displacement of the pulses generated by said second circuit means relative to the pulses generated by said adjustable frequency pulse generator is adjustable to provide control of the conduction periods of said switching elements and consequently control of the amplitude of the reference waveform.

4. The combination as claimed in claim 1 wherein said second circuit means includes an adjustable time delay circuit having an input and an output terminal, said input terminal connected to the output terminal of said adjustable frequency pulse generator, said time delay circuit being responsive to the output pulses of said adjustable frequency pulse generator and generating output pulses at a selected delay time interval, said pulse generator pulses initiating the switch actuation period, said delay pulses determining said conduction periods.

5. The combination as claimed in claim 1 wherein said first circuit means includes a multistage counter circuit having an input terminal and a plurality of output terminals, each output terminal corresponding to a stage of said counter circuit, said input terminal connected to the output of said adjustable frequency pulse generator, the output pulses of said adjustable frequency pulse generator incrementing the stages of said counters, the output of said counter actuating said switch elements.

6. The combination as claimed in claim 1 including circuit means for maintaining the limits of the conduction periods of said switching element combinations within the limits of the actuating period of said switching element combination.

7. The combination as claimed in claim 1 including logic means for actuating to a closed condition switching elements corresponding to the same input phase during the portion of the actuation period not occupied by conduction periods, all other switching elements remaining opened.

8. The combination as claimed in claim 1 including isolating circuit means interposed between said first circuit means and said switching elements.

9. The combination as claimed in claim 1 wherein the frequency of the reference waveform is a function of the output pulse rate of said adjustable frequency pulse generator.

10. The combination as claimed in claim 1 wherein the phase reversal capability of the adjustable frequency pulse generator is a function of the polarity of the excitation voltage.

11. The combination as claimed in claim 1 wherein the relationship of output waveform frequency to pulse generator frequency and input voltage source frequency is represented as $$f_o = \frac{f_p}{n} - f_1$$

where $f_o$ is output waveform frequency, $f_1$ is input voltage source frequency, $f_p$ is pulse generator frequency and $n$ is the number of phases of input voltage.